(12) United States Patent
Bryan et al.

(10) Patent No.: US 9,521,504 B1
(45) Date of Patent: Dec. 13, 2016

(54) CHANNEL SELECTION IN A MOBILE COMMUNICATION DEVICE APPLICATION FRAMEWORK

(71) Applicant: Sprint Communications Company L.P., Overland Park, KS (US)

(72) Inventors: Jeff H. Bryan, Olathe, KS (US); Christine M. Crowell, Olathe, KS (US); Bill G. McCracken, Olathe, KS (US); Roberto Murillo, Blue Springs, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/956,468

(22) Filed: Dec. 2, 2015

(51) Int. Cl.
*H04W 72/00* (2009.01)
*H04W 4/00* (2009.01)
(Continued)

(52) U.S. Cl.
CPC ............ *H04W 4/001* (2013.01); *H04M 15/61* (2013.01); *H04M 15/8214* (2013.01); *H04W 4/02* (2013.01); *H04W 12/06* (2013.01); *H04W 88/06* (2013.01); *H04W 88/08* (2013.01); *H04W 88/02* (2013.01)

(58) Field of Classification Search
CPC ...... H04W 8/005; H04W 24/04; H04W 28/24; H04W 84/12; H04W 16/14; H04W 24/00; H04W 52/0216; H04W 72/02; H04W 88/08; H04W 24/02; H04W 48/17; H04W 52/226; H04W 52/367; H04W 12/06; H04W 88/06; H04W 4/001; H04W 4/02; H04W 36/08; H04W 4/003; H04W 88/18; H04W 67/26; H04L 67/26; H04L 12/1407; H04L 41/5054; H04L 65/1016; H04L 45/22; H04L 47/14; H04L 1/0002; H04L 2029/06054; H04M 15/46; H04M 1/72566; H04M 1/72572; H04M 15/80; H04M 15/8083; H04M 2207/12
(Continued)

(56) References Cited

U.S. PATENT DOCUMENTS

2015/0117388 A1* 4/2015 Liu ...................... H04W 72/082
370/329
2015/0223265 A1* 8/2015 Fwu ...................... H04W 52/04
370/329

OTHER PUBLICATIONS

Bryan, Jeff H., et al., "Service Composition in a Mobile Communication Device Application Framework," filed Mar. 4, 2016, U.S. Appl. No. 15/062,041.
(Continued)

*Primary Examiner* — Fred Casca

(57) ABSTRACT

A user equipment (UE) comprising a processor, a memory, a radio transceiver, and a mobile application framework client stored in the memory. When executed by the processor the client receives a request for a communication service via an API, builds a service request message comprising an application identity and an identity of the requested service, transmits the service request message via the radio transceiver directed through a first communication channel defined by a first access point node (APN) specified by the client to a server, receives a first service response message comprising a second APN from the server, transmits the service request message via the radio transceiver directed through a second communication channel defined by the second APN to the server, and receives a second service response message from the second communication channel defined by the second APN from the server.

15 Claims, 8 Drawing Sheets

(51) Int. Cl.
*H04M 15/00* (2006.01)
*H04W 12/06* (2009.01)
*H04W 88/06* (2009.01)
*H04W 4/02* (2009.01)
*H04W 88/08* (2009.01)
*H04W 88/02* (2009.01)

(58) Field of Classification Search
USPC .............. 455/406, 450, 434, 509, 418, 522, 62,455/408, 414.1, 455, 515
See application file for complete search history.

(56) References Cited

OTHER PUBLICATIONS

Bryan, Jeff H., et al., "Security Tiering in a Mobile Communication Device Application Framework," filed Dec. 1, 2015, U.S. Appl. No. 14/956,243.

\* cited by examiner

CHANNEL SELECTION IN A MOBILE COMMUNICATION DEVICE APPLICATION FRAMEWORK

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices are becoming increasingly powerful and widely used. Many mobile devices are able to download and install mobile applications, sometimes called user applications or third party applications, after the device has been purchased and activated for mobile communication service. These mobile applications may provide some of their functionality based on communicating with application servers in the Internet. Sometimes mobile applications may provide a kind of bundled service that combines functionality from multiple third party providers.

SUMMARY

In an embodiment, a user equipment (UE) is disclosed. The UE comprises a processor, a non-transitory memory, a radio transceiver, and a mobile application framework client stored in the non-transitory memory that. When executed by the processor, the client receives a request for a communication service via an application programming interface (API) implemented by the client, responsive to the request for communication service, builds a service request message comprising an application identity and an identity of the requested service, and transmits the service request message via the radio transceiver directed through a first communication channel defined by a first access point node (APN) specified by the client to a mobile application framework server. The client further receives a first service response message via the radio transceiver from the mobile application framework server, wherein the first service response message comprises an identity of a second APN, responsive to the first service response message, transmits the service request message via the radio transceiver directed through a second communication channel defined by the second APN to the mobile application framework server, and receives a second service response message via the radio transceiver from the second communication channel defined by the second APN from the mobile application framework server, wherein the second service response comprises content supporting the communication service requested via the API implemented by the client.

In another embodiment, a method of mobile communication is disclosed. The method comprises receiving a first service request message by a mobile application framework server from a mobile application framework client executing on a user equipment (UE) over a first communication channel defined by a first access point node (APN), where the first service request message identifies a service to be performed for a mobile application executing on the UE, determining that the first service request message was received over the first communication channel defined by the first APN by the mobile application framework server, and looking up a second APN based on a signature of the first service request message by the mobile application framework server. The method further comprises sending a first service response message comprising the second APN by the mobile application framework server to the mobile application framework client on the UE, receiving a second service request message by the mobile application framework server from the mobile application framework client on the UE over a second communication channel defined by the second APN, where the second service request message identifies the service to be performed for the mobile application framework client on the UE, and responsive to receiving the second service request message, sending content in fulfillment of the service identified in the second service request message by the mobile application framework server over the second communication channel defined by the second APN to the mobile application framework client on the UE.

In yet another embodiment, another method of mobile communication is disclosed. The method comprises receiving a request for a communication service via an application programming interface (API) implemented by a mobile application framework client executing on a user equipment (UE), responsive to the request for communication service, building a service request message comprising an application identity and an identity of the requested service by the client, and transmitting the service request message via a radio transceiver of the UE directed through a first communication channel defined by a first access point node (APN) specified by the client to a mobile application framework server. The method further comprises receiving a first service response message by the client via the radio transceiver from the mobile application framework server, wherein the first service response message comprises an identity of a second APN, responsive to the first service response message, transmitting the service request message by the client via the radio transceiver directed through a second communication channel defined by the second APN to the mobile application framework server; and receiving a second response message by the client via the radio transceiver from the second communication channel defined by the second APN from the mobile application framework server, wherein the second response comprises content supporting the communication service requested via the API implemented by the client.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
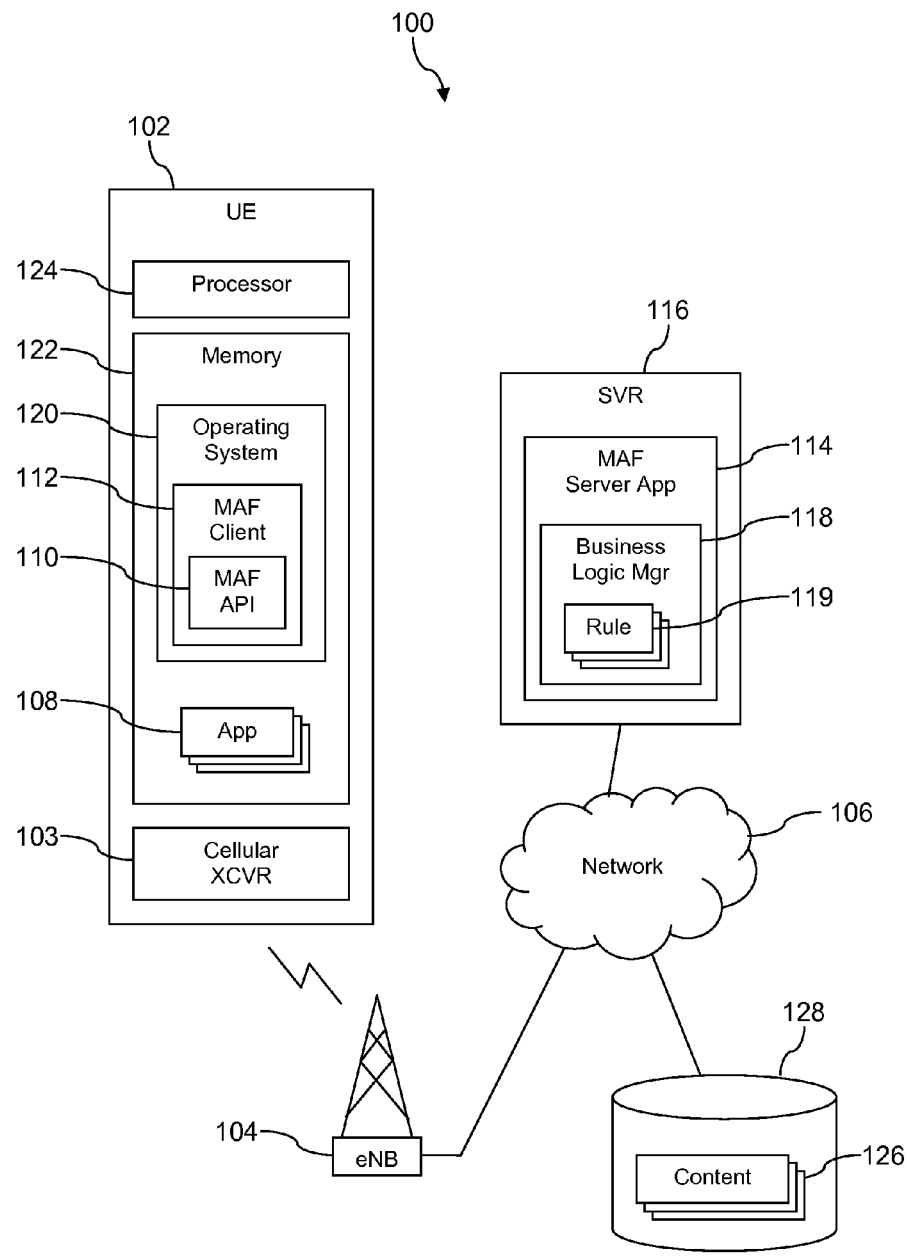
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a mobile application framework (MAF) that provides context driven data communication channel selection for performing service requests for mobile applications installed on user equipments (UEs). The UEs may be mobile communication devices such as mobile phones, smart phones, personal digital assistants (PDAs), media players, wearable computers, headset computers, laptop computers, notebook computers, or tablet computers. The mobile applications may be user applications or third party applications that have been installed on the UE.

The mobile application framework provides a single application programming interface (API) for use by multiple different mobile applications to invoke methods to access services provided by the framework in a uniform way. The mobile application framework, through this single API, supports communication routing over multiple different communication channels to provide differentiated communication treatment on each different communication channel. For example, the mobile applications may make a service request via the API to access content comprising information about a subscriber associated with the UE, content associated with the subscriber associated with the UE, content desired for performing operations of the mobile application, and other content. The framework may provide security processing so that the subject access to content is done in a way to protect the confidentiality of the content. The mobile application framework may further promote ease of bundling a service composed of services provided by multiple independent companies or service developers.

The mobile application framework comprises a mobile application framework client that executes on UEs and a mobile application framework server that executes on a computer system. The mobile application framework server may be a computer application. Mobile applications invoke an API extended by the mobile application framework client, and the client interworks with the mobile application framework server to provide the service associated with the invoked API method. In an embodiment, the mobile application framework client may be embedded and/or encapsulated in an operating system of the UE.

When a mobile application requests access to content via a service supported by the mobile application framework API, the mobile application client builds a service request message identifying the type of content and/or service requested. The service request message may comprise additional information that, along with the identification of the content and/or service requested, constitutes a signature of the request. The additional information may comprise one or more of an application identity, a UE identity, a subscriber identity, an identity of a wireless communication service provider associated with the UE, and other information. In an embodiment, the application identity may be provided in the form of an application authentication token, and the UE identity may be provided in the form of a UE authentication token. For further details about authentication tokens and security operations of a mobile application framework, see U.S. patent application Ser. No. 14/956,243, filed Dec. 1, 2015, entitled "Security Tiering in a Mobile Communication Device Application Framework," by Jeff H. Bryan, et al., which is incorporated herein in its entirety.

The mobile application framework client sends the service request message via a wireless communication link into a communication network, designating a specific data communication channel path over which the service request is to be fulfilled by identifying an access point node (APN) for the service request. The mobile application framework server receives the service request message and determines what APN the service request was handled by. The mobile application framework further uses the signature of the request (i.e., one or more of the application identity, the UE identity, the subscriber identity, the service provider identity, etc.) to determine what APN should be used to fulfill the service request.

In an embodiment, a business logic manager application that is a part or component of the server performs this processing and maps the signature to an APN. The business logic manager application may be configured with a plurality of rules that the business logic manager application uses, at least in part, to map the signature to an APN. Alternatively, the rules may be stored in a data store separate from the business logic manager application, and the business logic manager application may access the data store to read the rules. The business logic manager supports selecting the communication channel path for fulfillment of the service request based on the context of the request—based on the content and/or service requested and the signature. It is contemplated that this context driven channel selection mechanism can provide a wide range of communication processing, generally related to selecting different treatments that can be provided to the service requests. In some contexts, this communication channel selection may be referred to as communication channel routing, but note that this routing is not an activity that takes place at the network layer of a communication protocol stack but at an application layer—at the layer of the mobile application framework.

The business logic manager application can associate the service request to an APN where content transmitted to the UE is not counted towards a usage total associated with a communication service subscription account (e.g., non-billed communication). Alternatively, the business logic manager application may associate the service request to an APN where the content transmitted to the UE is counted towards the usage total (e.g., billed communication). In an embodiment, the business logic manager application may provide the service request with other treatments that map to different qualities of service, for example a first APN association may result in the communication being served with a first quality of service, a second APN association may result in the communication being served with a second quality of service, and a third APN association may result in the communication being served with a third quality of service. Other treatments may be associated with different APNs by the business logic manager application. Again, it is noted that APNs identify specific communication channels, and that different APNs identify different communication channels.

After mapping the service request to an APN, the mobile application framework server determines if the APN is different than the APN that the service request was received from. If the APN is not different, the mobile application framework server may proceed to provide the requested service using the APN selected by the UE, for example retrieving content from a content server maintained by a developer of the mobile application executing on the UE that requested the service and returning the content via the communication channel path associated with the APN. It is understood that the mobile application framework server may communicate with the content server over the same communication channel path associated with that APN.

If, after the mapping, the APN determined by mapping is different from the APN that the service request was received from, the mobile application framework server sends a service response message to the mobile application framework client that comprises the different APN. The mobile application framework client reads the service response message and determines, based on the presence of the different APN, that it is expected to resend the original service request message via a different communication channel path associated with the different APN and resends the service request message to the mobile application framework server via that different APN. In an embodiment, the service response message may further comprise a response code whose value signals to the client that it is to resend the service request message via the APN identified in the service response message. The service response message may further identify the previous service request message so the UE may readily determine the service request message that is to be resent. The mobile application framework server receives the resent service request, recognizes that it has been sent via an APN that had been defined for the mobile application framework client and so does not perform the mapping operation again, and completes the service request using the APN.

The mobile application framework can benefit mobile communications in a variety of ways. It can reduce the efforts of application developers to integrate with the UE and/or the communication network by providing a consistent, uniform API extended by the mobile application framework client. Additionally, the mobile application framework can provide a mechanism to easily adapt treatment for different contexts—different applications, different UEs, different subscribers, different service requests—without the necessity of integrating with the mobile applications and/or with the mobile application framework clients. Service request treatment can be adapted simply by modifying the mapping provided by the business logic manager application of the mobile application framework server, for example. The subscriber can benefit from the mobile application framework in that more mobile applications may be developed and be provided for the UE, as a result of the reduced cycle time for developing mobile applications that rely on the mobile application framework to perform service requests.

Turning now to FIG. 1, a system 100 is described. In an embodiment, the system 100 comprises a user equipment (UE) 102, an enhanced node B (eNB) 104 or cell tower, a communication network 106, and one or more mobile applications 108 installed on the UE 102. The UE 102 may be a mobile communication device such as a mobile phone, a smart phone, a personal digital assistant (PDA), a media player, a wearable computer, a headset computer, a laptop computer, a tablet computer, or a notebook computer. The network 106 may comprise one or more public networks, one or more private networks, or a combination thereof. One or more of the mobile applications 108 may be installed by an original equipment manufacturer (OEM) of the UE 102. One or more of the mobile applications 108 may be installed after the UE 102 has been delivered to a subscriber and activated. One or more of the mobile applications 108 may be developed by third party application developers.

The UE 102 further comprises a cellular transceiver 103 which provides wireless communication links between the UE 102 and the eNB 104. The cellular transceiver 103 may communicate with the eNB 104 according to one or more of a long term evolution (LTE) wireless protocol, a code division multiple access (CDMA) wireless protocol, a global system for mobile communication (GSM) wireless protocol, a worldwide interoperability for microwave access (Wi-MAX) wireless protocol, or other wireless communication protocol. The UE 102 comprises a processor 124 and a memory 122. The memory 122 may be a non-transitory memory. The memory 122 comprises a mobile application framework (MAF) client 112 that provides a MAF application programming interface (API) 110. In an embodiment, the MAF client 112 is embedded or encapsulated in an operating system 120 of the UE 102. In another application, however, the MAF client 112 is not embedded in the operating system and is an application stored in a system partition of the memory 122 or, alternately, in a carrier partition of the memory 122.

It is understood that the system 100 may comprise any number of UEs 102 and any number of eNBs 104. Likewise, any number of mobile applications 108 may be installed on the UE 102, and different numbers of mobile applications 108 and different specific mobile applications 108 may be installed on different UEs 102.

The system 100 further comprises a mobile application framework (MAF) server 114 that executes on a server 116. It is understood that the MAF server 114 is a computer program or application that executes on the server 116. The MAF client 112 and the MAF server 114 may be said to constitute a mobile application framework. It is understood that the mobile application framework comprises the MAF server 114 and any number of MAF clients 112 installed on UEs 102 (e.g., MAF clients 112 installed on each of 50,000 UEs 102, MAF clients 112 installed on each of 500,000 UEs 102, MAF clients 112 installed on each of 5,000,000 UEs 102, or any number of UEs 102). The server 116 may be implemented as a computer system comprised of one or more computers. Computer systems are described further hereinafter.

When the mobile application 108 requests a communication service to be rendered on its behalf by the mobile application framework, it does so by invoking a method using the MAF API 110. The MAF client 112 receives the method call via the MAF API 110 and generates a service request message from the API method call. The service request message identifies a kind of service and any parameters related to the requested service such as a uniform resource locator (URL), an IP address, or other designation of a service end point that may have been provided in the API method call or previously configured by the mobile application 108 into the MAF client 112. The service request message may provide mobile application framework security related information. The service request message may provide an identity of the UE 102 and/or an identity of a subscriber associated with the UE 102. The service request message may provide an application state, for example a game level attained. The MAF API 110 may support requests from mobile applications for an add service request, a delete service request, a validate subscriber request, a get subscriber information request, a get UE information request, as well as other service requests.

The MAF client 112 then transmits the service request message via the cellular radio transceiver 103, over a wireless communication link provided by the eNB 104, over the network 106, to the MAF server 114 on the server 116. The MAF client 112 transmits this service request message with a designation of an access point node (APN) that defines a communication channel over which the service request message is transported in the network 106. The MAF client 112 may be configured to use a default APN for the service request message, in the absence of any instructions to the contrary from the MAF server 114, for example via an APN corresponding to a customary Internet communication path. In an embodiment the default APN may be stored in the memory 122.

When the MAF server 114 receives the service request message from the MAF client 112 it determines what APN the service request message was transported over (i.e., what communication channel defined by or designated by the APN the service request message was transported over). The MAF server 114 also parses the service request message to extract information from it, such as what service is requested, an identity of the mobile application 108 requesting the service, an identity of the UE 102, an identity of a subscriber associated with the UE 102, and an identity of a wireless communication service provider carrying a wireless communication service account for the UE 102. This information may be referred to as a signature of the service request message.

A business logic manager application 118 of the MAF server 114 maps the signature to what may be referred to as a "mapped APN" to distinguish it logically from the APN the MAF server 114 determined that the service request was transported over (i.e., the default APN). Each different APN identifies a different communication channel in the network 106. Each different APN and associated communication channel may provide a different treatment or processing of communication content that passes over the subject channel. In an embodiment, the business logic manager application 118 performs the mapping based on the signature and based on a set of business rules 119. The business rules 119 may be configured into or built into the business logic manager application 118, for example encapsulated in a code or logic of the business logic manager application 118. Alternatively, the business logic manager application 118 may read a file during initialization and store the business rules 119 in process memory or heap memory allocated to the business logic manager application 118. Alternatively, the business logic manager application 118 may read the business rules 119 on the fly or dynamically from a data store as needed, for example on the event of performing a mapping. Various implementations of the business logic manager application 118 access in the business rules 119 may support greater or lesser adaptability of the business rules 119 and greater or lesser run-time efficiency of the business logic manager application 118. One skilled in the art, in combination with the present disclosure, will readily be able to choose a suitable implementation of accessing the business rules 119 by the business logic manager application 118.

In some cases the business logic application 118 may map the signature to a "mapped APN" that is identical to the default APN. In this case, the MAF server 114 processes the service request and returns a service response message to the MAF client 112, and the MAF client 112 returns a response to the application 108 via the MAF API 110. For example, the MAF server 114 requests a copy of content 126 from a data store 128 identified by the service request message over the default APN, receives the copy of the content 126 over the default APN, and returns the copy of the content 126 encapsulated in a service response message over the default APN to the MAF client 112.

In other cases, however, the "mapped APN" is different from the default APN. In this case, the MAF server 114 returns a service response message to the MAF client 112 comprising the "mapped APN." In an embodiment, the MAF server 114 may return a service response message to the MAF client 112 that comprises a response code designating a communication channel reroute and comprises the "mapped APN." In other words, the response code may signal to the UE 102 that it is expected to resend a service request message directed through a communication channel defined by the APN in the service response message. In either case, when the MAF client 112 receives the service response message containing the "mapped APN," it retransmits the original service request message (or a copy) via the "mapped APN" to the MAF server 114. The MAF server 114 then performs the indicated service request, for example requesting and receiving a copy of content 126 from the data store 128 over the "mapped APN," and returns a service response to the MAF client 112 over the "mapped APN." While the discussion above described communication between the UE 102 and the server 116 passing over a cellular wireless link between the cellular transceiver 103 and the eNB 104, in an embodiment the UE 102 may further comprise a short range radio transceiver (not shown) that is able to establish wireless links to an access point (AP) (not shown) using a Wi-Fi short range wireless protocol, using a Bluetooth® short range wireless protocol, or using a different short range wireless protocol and link from the AP to the network 106.

By routing service requests, content requests, content, and service responses over the "mapped APN," a treatment that the service receives may be controlled. For example, a default APN communication channel may be associated with tolling (i.e., billing) data traffic against a data usage count of a subscription wireless service account of the UE 102. This communication channel may be referred to in some contexts as a billing channel or a billed channel. A first "mapped APN" may be associated with not tolling (i.e., not billing) data traffic against the data usage count of subscription account the UE 102. The first "mapped APN" may define a second communication channel that may be referred to as a non-billing channel or a non-billed channel. A second "mapped APN" may be associated with a first premium quality of service (QoS) for transporting content from the data store 128 to the MAF server 114 and from the MAF server 114 to the MAF client 112. A third "mapped APN" may be associated with a second, higher, premium QoS for transporting content to the MAF client 112 from the data store 128. In an embodiment, the MAF server 114 may request content 126 from the data store 128 be routed from the data store 128 to the UE 102, over either the default APN or a "mapped APN," leaving the MAF server 114 out of the transport path. Yet further treatments linked to different "mapped APNs" are contemplated by the present disclosure.

The data store 128 may be maintained by an original equipment manufacturer (OEM), may be a wireless service provider subscriber data store, a user profile data store. In an embodiment, the data store 128 may be mediated by a mobile application developer back office server. In an embodiment, back office servers (not shown) may be coupled to the network 106, and the mobile applications 108 may request services from the back office servers using the mobile application framework.

In some cases the mobile application 108 may have been developed by a third party that negotiates with a wireless service provider that operates the mobile application framework to allow content 126 to transit the network 106 without tolling the subscriber's data usage (i.e., unbilled traffic). The business application manager can identify the mobile application 108 by the service request message signature and map it to the appropriate non-billed "mapped APN." If, at a later time, the wireless service provider and the third party sever their business arrangement, it is a simple matter to resume tolling of the content 126 requested by the mobile application 108 by altering the definition of signature to "mapped APN" mapping in the business logic manager application 118 and/or in a configuration file on the server 116. Some service requests of a mobile application 108 may map to a non-billed "mapped APN" while other service requests of the same mobile application 108 may map to a billed "mapped APN."

Figure 2:
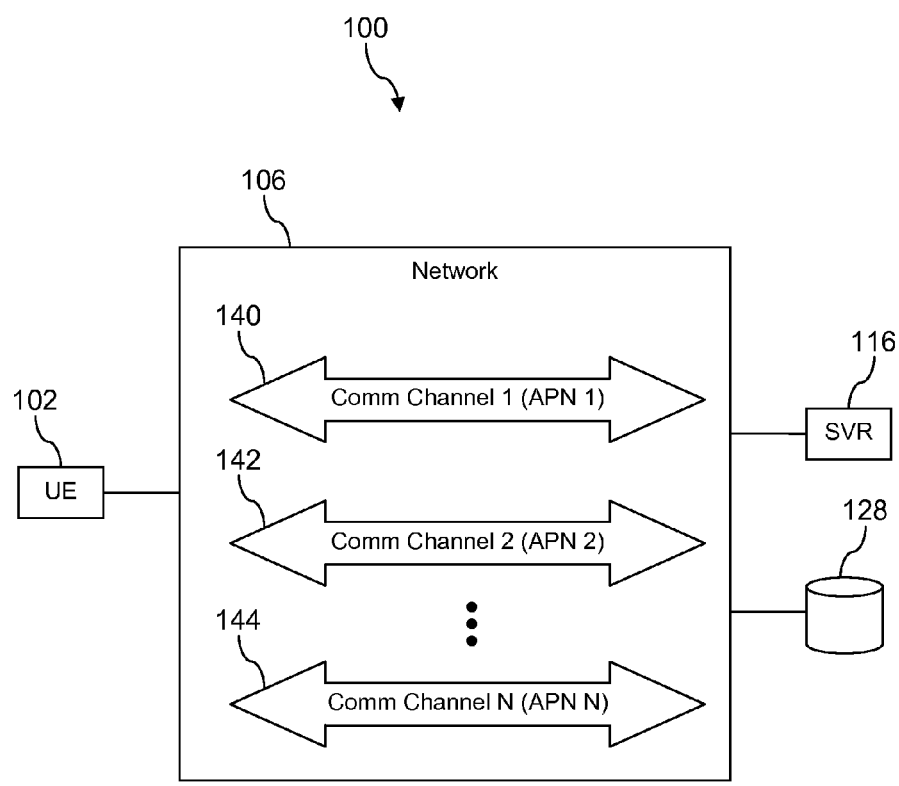
FIG. 2 is a block diagram of another abstraction of the communication system according to an embodiment of the disclosure.

Turning now to FIG. 2, an alternate abstraction of the system 100 is described. The system 100 has abstracted away some of the details of FIG. 1, for example the wireless communication link via the eNB 104 to the network 106 is replaced with a communication link to the network 106. Additionally, the communication within the network 106 is illustrated as taking place, at least for purposes of mobile application framework service communications, over a plurality of different communication channels, a first communication channel 140 associated with a first APN, a second communication channel 142 associated with a second APN, and a third communication channel 144 associated with a third APN. It is understood that the network 106 may support any number of communication channels associated with or defined by corresponding APNs. Each different communication channel 140, 142, 144 can provide different treatments to the communication content that is transported over the channel.

Figure 3:
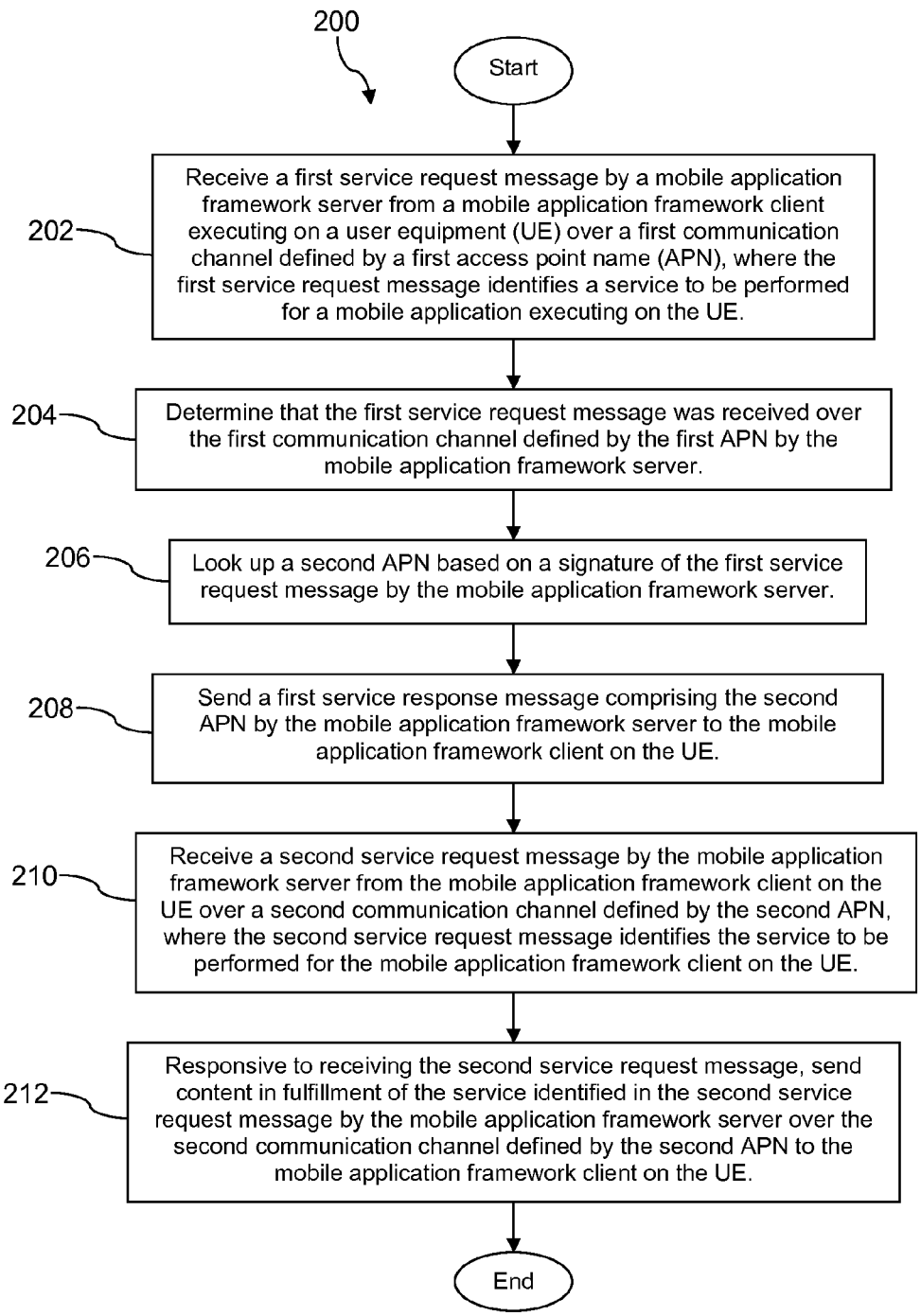
FIG. 3 is a flow chart of a method according to an embodiment of the disclosure.

Turning now to FIG. 3, a method 200 is described. At block 202, receive a first service request message by a mobile application framework server from a mobile application framework client executing on a user equipment (UE) over a first communication channel defined by a first access point node (APN), where the first service request message identifies a service to be performed for a mobile application executing on the UE. For example, the MAF server 114 receives the first service request message from the UE 102. At block 204, determine that the first service request message was received over the first communication channel defined by the first APN by the mobile application framework server. The first APN may be the default APN. The first communication channel may be the first communication channel 140.

At block 206, look up a second APN based on a signature of the first service request message by the mobile application framework server. For example, the business logic manager application 118 looks up the mapping based on the signature of the first service request message and based on the set of business rules 119. The signature may comprise one or more of what service is requested, an identity of the mobile application 108 requesting the service, an identity of the UE 102, an identity of a subscriber associated with the UE 102, and an identity of a wireless communication service provider carrying a wireless communication service account for the UE 102. At block 208, send a first service response message comprising the second APN by the mobile application framework server to the mobile application framework client on the UE. The first service response message may further comprise a response code whose value signals to the UE 102 to resent the service request using the second APN. The first service response message may further comprise an identification of the first service request message or a pair of the requested service and the application identity.

At block 210, receive a second service request message by the mobile application framework server from the mobile application framework client on the UE over a second communication channel defined by the second APN, where the second service request message identifies the service to be performed for the mobile application framework client on the UE. At block 212, responsive to receiving the second service request message, send content in fulfillment of the service identified in the second service request message by the mobile application framework server over the second communication channel defined by the second APN to the mobile application framework client on the UE.

Figure 4:
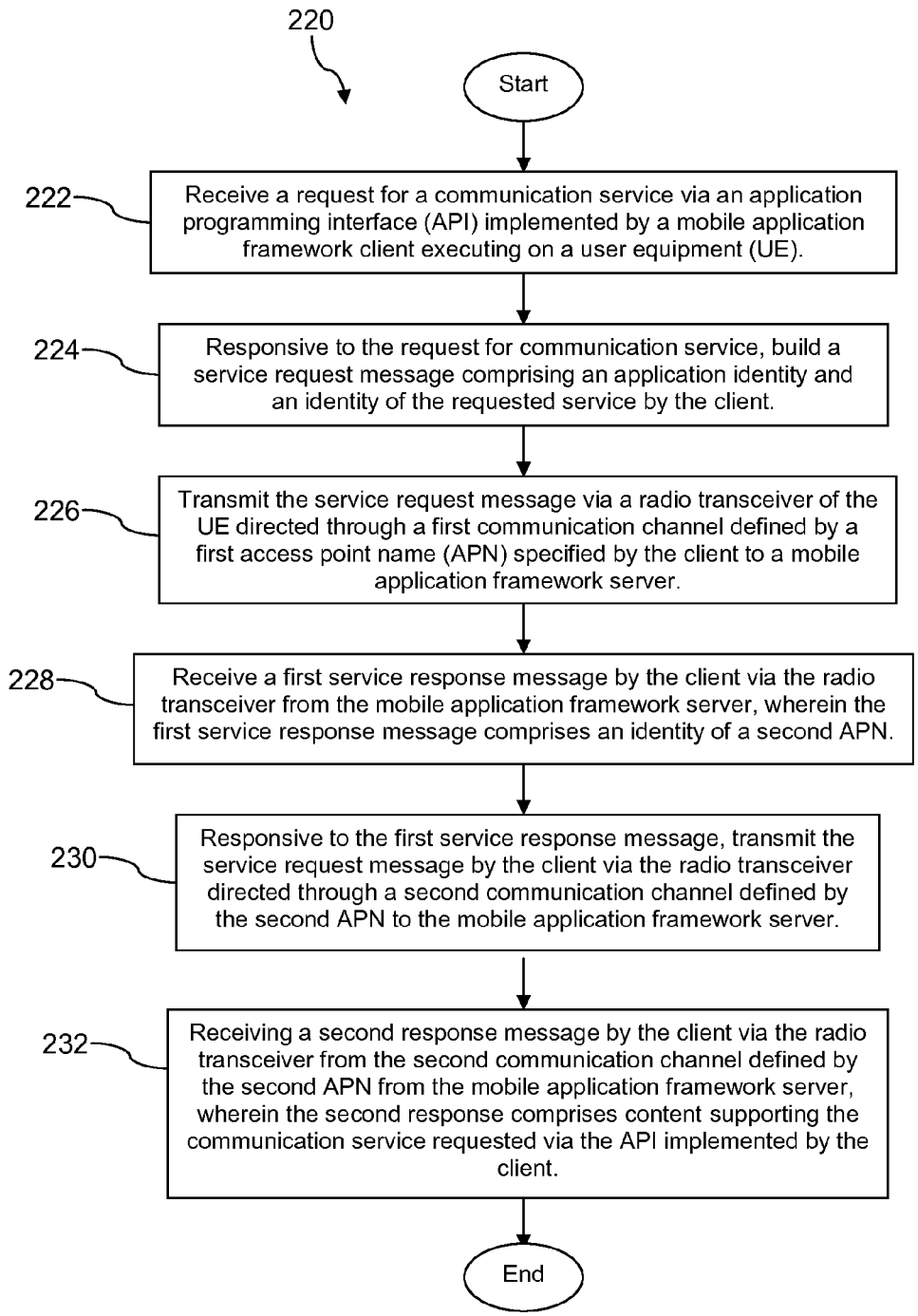
FIG. 4 is a flow chart of another method according to an embodiment of the disclosure.

Turning now to FIG. 4, a method 220 is described. At block 222, receive a request for a communication service via an application programming interface (API) implemented by a mobile application framework client executing on a user equipment (UE). For example, receive a method invocation via the MAF API 110 from a mobile application 108 identifying a communication service requested. At block 224, responsive to the request for communication service, build a service request message comprising an application identity and an identity of the requested service by the client. The service request message, in an embodiment, may comprise one or more of an identity of the UE 102, an identity of a subscriber associated with the UE 102, and a wireless communication service provider.

At block 226, transmit the service request message via a radio transceiver of the UE directed through a first communication channel defined by a first access point node (APN) specified by the client to a mobile application framework server. The UE 102 may transmit the service request message via the cellular radio transceiver 103 to the eNB 104 and then to the network 106 or via a short range radio transceiver (not shown) to an access point and then to the network 106. At block 228, receive a first service response message by the client via the radio transceiver from the mobile application framework server, wherein the first service response message comprises an identity of a second APN. The first service response message may further comprise a response code as described above. At block 230, responsive to the first service response message, transmit the service request message by the client via the radio transceiver directed through a second communication channel defined by the second APN to the mobile application framework server. At block 232, receive a second response message by the client via the radio transceiver from the second communication channel defined by the second APN from the mobile application framework server, wherein the second response comprises content supporting the communication service requested via the API implemented by the client.

Figure 5:
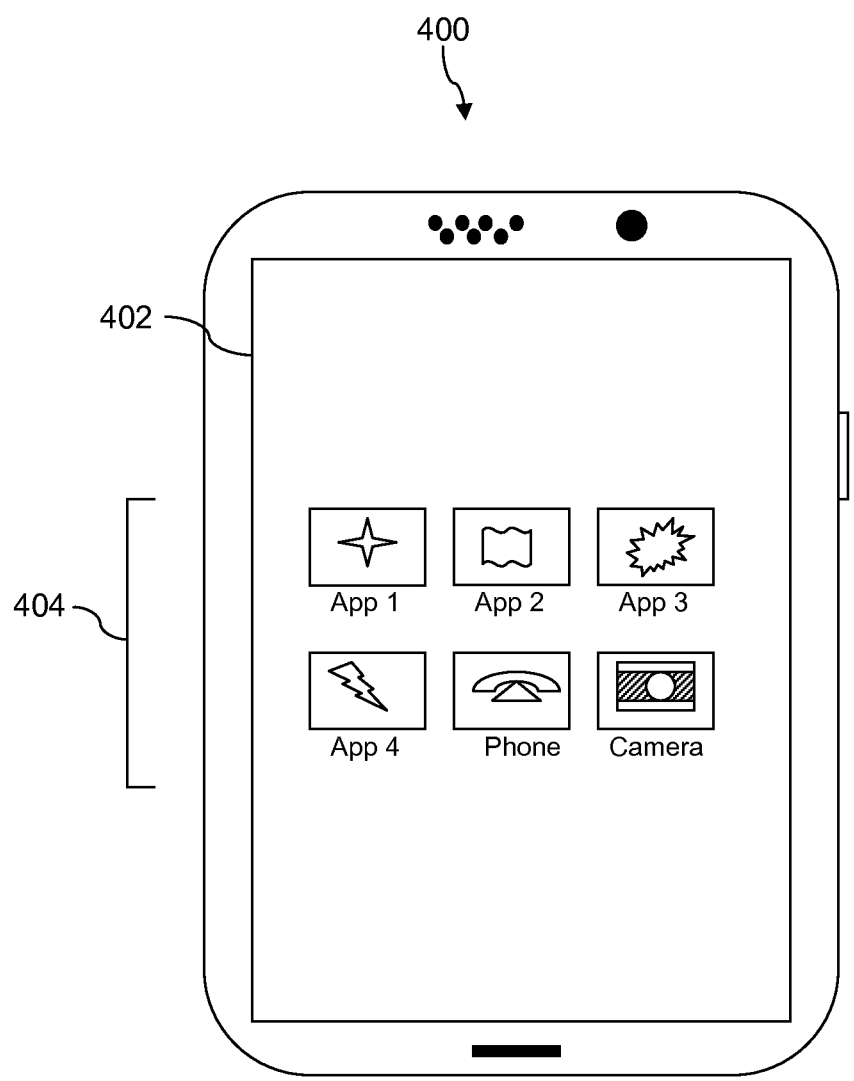
FIG. 5 is an illustration of a user equipment according to an embodiment of the disclosure.

FIG. 5 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 6:
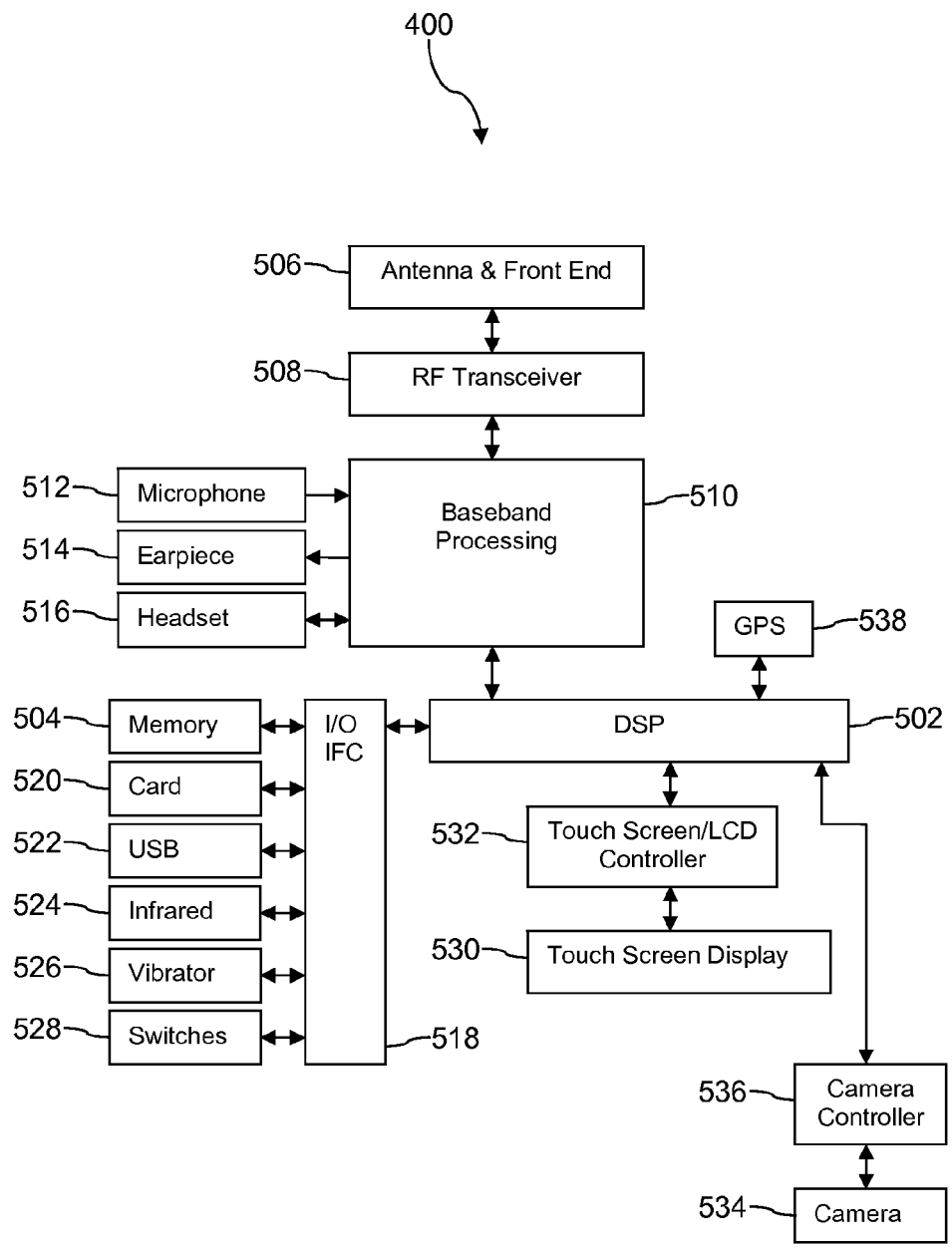
FIG. 6 is a block diagram of a hardware architecture of a user equipment according to an embodiment of the disclosure.

FIG. 6 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 7A:
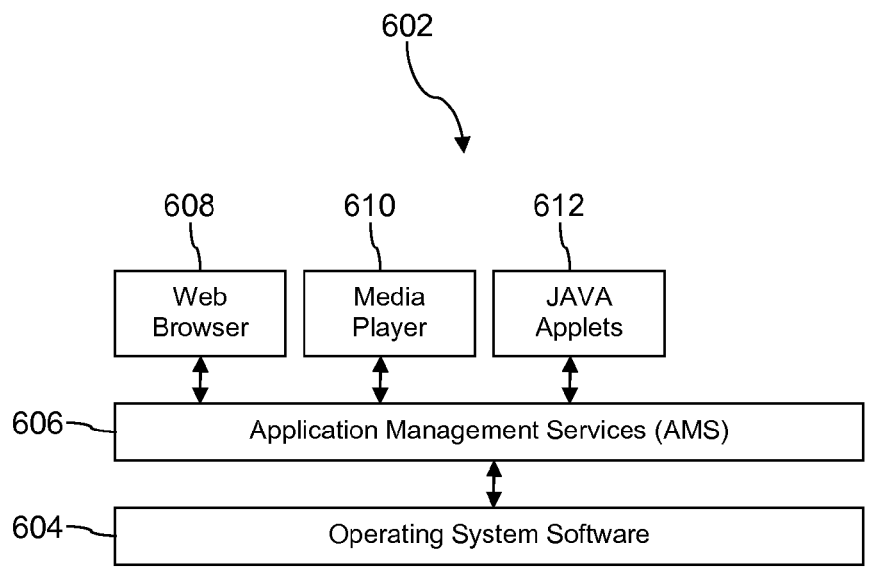
FIG. 7A is a block diagram of a software architecture of a user equipment according to an embodiment of the disclosure.

FIG. 7A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 6A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 7B:
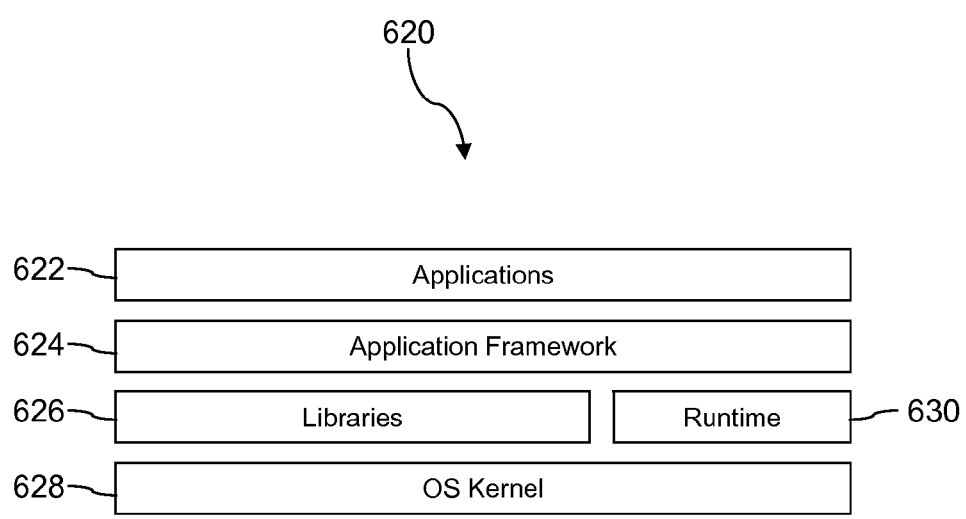
FIG. 7B is a block diagram of another software architecture of a user equipment according to an embodiment of the disclosure.

FIG. 7B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 8:
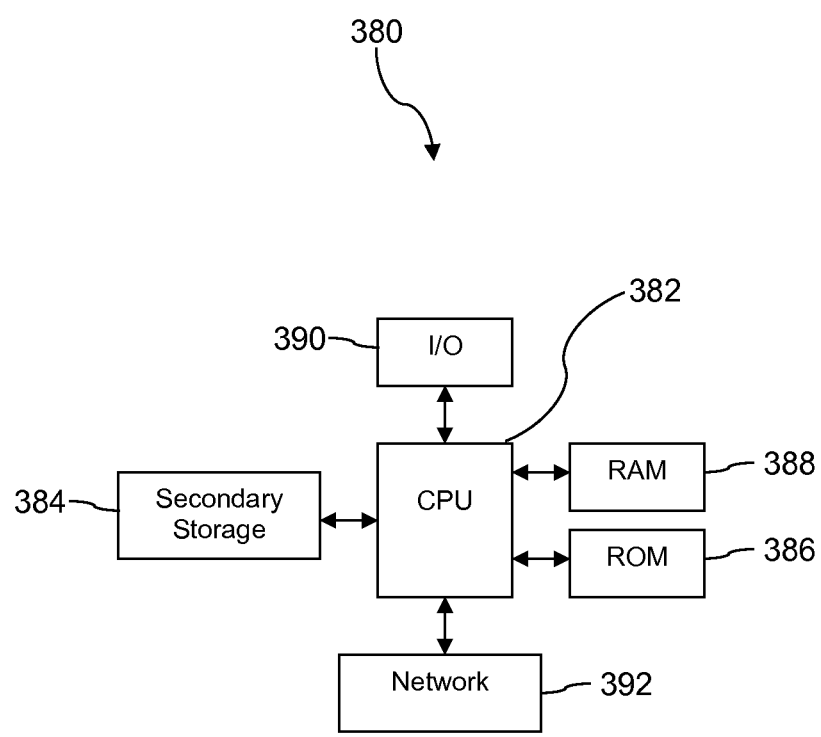
FIG. 8 is a block diagram of a computer system according to an embodiment of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A user equipment (UE), comprising:
a processor;
a non-transitory memory;
a radio transceiver;
a mobile application framework client stored in the non-transitory memory that, when executed by the processor
receives a request for a communication service via an application programming interface (API) implemented by the mobile application framework client, responsive to the request for communication service, builds a service request message comprising an application identity and an identity of the requested service, transmits the service request message via the radio transceiver directed through a first communication channel defined by a first access point node (APN) specified by the mobile application framework client to a mobile application framework server, wherein the first communication channel comprises a billed channel, and wherein content that flows to the UE over the billed channel is aggregated to a data usage count of a wireless communication subscription account associated with the UE, receives a first service response message via the radio transceiver from the mobile application framework server, wherein the first service response message comprises an identity of a second APN, responsive to the first service response message, transmits the service request message via the radio transceiver directed through a second communication channel defined by the second APN to the mobile application framework server, and receives a second service response message via the radio transceiver from the second communication channel defined by the second APN from the mobile application framework server, wherein the second service response comprises content supporting the communication service requested via the API implemented by the mobile application framework client.

2. The UE of claim 1, wherein the UE is one of a mobile communication device, a mobile phone, a smart phone, a personal digital assistant (PDA), a media player, a wearable computer, a headset computer, a laptop computer, a tablet computer, or a notebook computer.

3. The UE of claim 1, wherein the radio transceiver establishes a wireless communication link with a cell tower according to at least one of a long term evolution (LTE), a code division multiple access (CDMA), a global system for mobile communication (GSM), and a worldwide interoperability for microwave access (WiMAX) wireless communication protocol.

4. The UE of claim 1, wherein the radio transceiver establishes a wireless communication link with at least one of a Wi-Fi access point and a BLUETOOTH access point.

5. The UE of claim 1, wherein the non-transitory memory stores a default APN, and where the first APN specified by the mobile application framework client is the default APN.

6. The UE of claim 1, wherein the second communication channel comprises a non-billed channel, where content that flows to the UE over the non-billed channel is not aggregated to the data usage count of the wireless communication subscription account associated with the UE.

7. The UE of claim 6, wherein the mobile application framework client further:

receives a second request for a communication service via the application programming interface (API) implemented by the mobile application framework client, responsive to the second request for communication service, builds a second service request message comprising a second application identity and a second identity of the requested service, transmits the second service request message via the radio transceiver directed through the first communication channel defined by the first APN to a mobile application framework server, receives a third service response message via the radio transceiver from the mobile application framework server, wherein the third service response message comprises an identity of a third APN, responsive to the third service response message, transmits the second service request message via the radio transceiver directed through a third communication channel defined by the third APN to the mobile application framework server, and receives a fourth response message via the radio transceiver from the third communication channel defined by the second APN from the mobile application framework server, wherein the fourth response comprises content supporting the communication service requested via the API implemented by the mobile application framework client, wherein the third communication channel comprises a premium quality of service (QoS) channel, where content that flows to the UE over the premium QoS channel receives a higher QoS.

8. A method of mobile communication performed by a processor or processors, comprising:

receiving a first service request message by a mobile application framework server from a mobile application framework client executing on a user equipment (UE) over a first communication channel defined by a first access point node (APN), where the first service request message identifies a service to be performed for a mobile application executing on the UE, wherein the first communication channel comprises a billed channel, and wherein content that flows to the UE over the billed channel is aggregated to a data usage count of a wireless communication subscription account associated with the UE;

determining that the first service request message was received over the first communication channel defined by the first APN by the mobile application framework server;

looking up a second APN based on a signature of the first service request message by the mobile application framework server, wherein the signature of the first service request message comprises two or more of an identity of the mobile application executing on the UE, the identity of the service to be performed, an identity of the UE, an identity of a subscriber associated with the UE, and a wireless communication service provider associated with the UE, and wherein looking up the second APN is performed by a business logic manager component of the mobile application framework server based on the signature of the first service request message and based on a set of business rules;

sending a first service response message comprising the second APN by the mobile application framework server to the mobile application framework client on the UE;

receiving a second service request message by the mobile application framework server from the mobile application framework client on the UE over a second communication channel defined by the second APN, where the second service request message identifies the service to be performed for the mobile application framework client on the UE; and responsive to receiving the second service request message, sending content in fulfillment of the service identified in the second service request message by the mobile application framework server over the second communication channel defined by the second APN to the mobile application framework client on the UE.

9. The method of claim 8, wherein the first service response message further comprises a response code that indicates the UE is expected to resend a service request message directed through a communication channel defined by the APN in the first service response message.

10. The method of claim 8, wherein different APNs define different treatments for service requests.

11. The method of claim 10, wherein the first communication channel receives a billing treatment and the second communication channel receives a non-billing treatment.

12. The method of claim 8, further comprising requesting content in fulfillment of the service identified in the second service request message from one of an original equipment manufacturer (OEM) data store, a wireless service provider subscriber data store, a user profile data store, or a mobile application developer back office server.

13. A method of mobile communication performed by a processor or processors, comprising:
receiving a request for a communication service via an application programming interface (API) implemented by a mobile application framework client executing on a user equipment (UE), wherein the API implemented by the mobile application framework client supports requests from mobile applications for an add service request, a delete service request, a validate subscriber request, a get subscriber information request, and a get UE information request;
responsive to the request for communication service, building a service request message comprising an application identity and an identity of the requested service by the mobile application framework client, wherein the service request message further comprises one or more of an identity of the UE and an identity of a subscriber associated with the UE;
transmitting the service request message via a radio transceiver of the UE directed through a first communication channel defined by a first access point node (APN) specified by the mobile application framework client to a mobile application framework server, wherein the first communication channel comprises a billed channel, and wherein content that flows to the UE over the billed channel is aggregated to a data usage count of a wireless communication subscription account associated with the UE;
receiving a first service response message by the mobile application framework client via the radio transceiver from the mobile application framework server, wherein the first service response message comprises an identity of a second APN;
responsive to the first service response message, transmitting the service request message by the mobile application framework client via the radio transceiver directed through a second communication channel defined by the second APN to the mobile application framework server; and
receiving a second response message by the mobile application framework client via the radio transceiver from the second communication channel defined by the second APN from the mobile application framework server, wherein the second response comprises content supporting the communication service requested via the API implemented by the mobile application framework client.

14. The method of claim 13, wherein the first response message further comprises a response code that signals the mobile application framework client to resend a service request message directed through a communication channel defined by the second APN in the first service response message.

15. The method of claim 13, wherein the first communication channel and the second communication channel provide different communication treatments.

* * * * *